United States Patent
Livny et al.

(10) Patent No.: US 11,263,544 B2
(45) Date of Patent: Mar. 1, 2022

(54) SIMILARITY BASED APPROACH FOR CLUSTERING AND ACCELERATING MULTIPLE INCIDENTS INVESTIGATION

(71) Applicant: Microsoft Technology Licensing, LLC, Redmond, WA (US)

(72) Inventors: Yotam Livny, Gadera (IL); Roy Levin, Haifa (IL); Ram Haim Pliskin, Rishon Lezion (IL); Ben Kliger, Ramat Gan (IL); Mathias Abraham Marc Scherman, Tel Aviv (IL); Moshe Israel, Ramat Gan (IL); Michael Zeev Bargury, Ramat Gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 806 days.

(21) Appl. No.: 16/105,189

(22) Filed: Aug. 20, 2018

(65) Prior Publication Data

US 2020/0057953 A1   Feb. 20, 2020

(51) Int. Cl.
| G06N 5/04 | (2006.01) |
| G06N 99/00 | (2019.01) |
| G06N 20/00 | (2019.01) |
| H04L 29/06 | (2006.01) |

(52) U.S. Cl.
CPC .......... *G06N 5/048* (2013.01); *G06N 20/00* (2019.01); *H04L 63/1416* (2013.01)

(58) Field of Classification Search
CPC ..... G06F 21/552; G06F 21/554; G06N 5/048; G06N 20/00; G06N 7/005; G06N 20/20; G06N 20/10; G06N 5/003; H04L 41/0654; H04L 63/1441; H04L 41/065;
(Continued)

(56) References Cited

U.S. PATENT DOCUMENTS

| 5,666,481 | A | * | 9/1997 | Lewis | ................. G06F 11/2257 |
| | | | | | 714/4.2 |
| 8,370,466 | B2 | | 2/2013 | Verma et al. | |
| 2002/0059078 | A1 | | 5/2002 | Valdes et al. | |

(Continued)

OTHER PUBLICATIONS

"International Search Report and Written Opinion Issued in PCT Application No. PCT/US2019/039658", dated Nov. 20, 2019, 20 Pages.

*Primary Examiner* — Abdullahi E Salad
(74) *Attorney, Agent, or Firm* — Fiala & Weaver P.L.L.C.

(57) ABSTRACT

Systems, methods, and apparatuses are provided for clustering incidents in a computing environment. An incident notification relating to an event (e.g., a potential cyberthreat or any other alert) in the computing environment is received and a set of features may be generated based on the incident notification. The set of features may be provided as an input to a machine-learning engine to identify a similar incident notification in the computing environment. The similar incident notification may include a resolved incident notification or an unresolved incident notification. An action to resolve the incident notification may be received, and the received action may thereby be executed. In some implementations, in addition to resolving the received incident notification, the action may be executed to resolve a similar unresolved incident notification identified by the machine-learning engine.

20 Claims, 8 Drawing Sheets

(58) Field of Classification Search
CPC ... H04L 41/14; H04L 41/069; H04L 63/1416; H04L 41/16; G05B 23/0272
See application file for complete search history.

(56) References Cited

U.S. PATENT DOCUMENTS

| | | | |
|---|---|---|---|
| 2015/0195165 A1* | 7/2015 | Boger | H04L 41/0618 709/224 |
| 2016/0344757 A1* | 11/2016 | Bartos | G06F 21/566 |
| 2018/0203752 A1* | 7/2018 | Howie | G06Q 10/06 |
| 2018/0205575 A1* | 7/2018 | Tian | H04L 69/22 |
| 2018/0307756 A1* | 10/2018 | Garay | G06N 20/00 |
| 2019/0012619 A1* | 1/2019 | Moss | G09B 7/02 |

* cited by examiner

SIMILARITY BASED APPROACH FOR CLUSTERING AND ACCELERATING MULTIPLE INCIDENTS INVESTIGATION

BACKGROUND

Incident management systems provide industry professionals with the ability to view and respond to incident reports, such as by investigating whether the report was generated due to benign or malicious activity. For instance, in an information technology (IT) setting, security analysts may receive incident reports corresponding to a wide range of activities occurring on various systems connected on a cloud-computing network. Analyzing each incident report in a timely manner is desired as certain incidents may comprise potential cyberthreats to one or more systems. Incident reports relating to cyberthreats are often analyzed as stand-alone cases, without correlating them to other potential cyberthreats. As a result, the resolution of such incident reports may be improperly or inconsistently handled, leading to a reduction in the overall quality and accuracy in the handling of potential cyberthreats.

While incidents of the same type may be grouped, such grouping based on the same incident type typically does not include grouping incidents accurately. Where incidents are not grouped appropriately, the security analyst responsible for handling the incident may misinterpret or inadvertently disregard a cyberthreat on the network. In addition, even in systems where different incidents of the same type may be grouped, the security analyst must still view and resolve each incident report separately, potentially leading to inconsistent and improper handling.

In another technique, incident reports may be prioritized based on an importance to the organization in which the report was generated, which may enable the security analyst to focus his or her attention on incidents deemed to be relatively important. However, assigning priorities to different incidents in an accurate manner often fail, for instance where the prioritization algorithm includes improper assumptions. In addition, even where prioritization techniques are implemented, each incident is still handled separately, as discussed above.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, and computer program products are provided for clustering incidents in a computing environment. An incident notification relating to an event (e.g., a potential cyberthreat or any other alert) in the computing environment is received. A set of features may be generated based on the received incident notification. The set of features may be provided as an input to a machine-learning engine that applies a machine-learning-based model to identify a similar incident notification in the computing environment. The similar incident notification may include a plurality of types of notifications, including a similar resolved incident notification or a similar unresolved incident notification. An action to resolve the incident notification may be received, and the received action may thereby be executed. In some implementations, in addition to resolving the received incident notification, the action may be executed to resolve a similar unresolved incident notification identified by the machine-learning engine and selected through a user interface.

In this manner, a machine-learning-based model may automatically identify one or more additional incident notifications, either resolved or unresolved, that may be similar to an incident notification a security analyst is presently viewing. For example, while handling an incident notification, the security analyst may be enabled to readily view information corresponding to similar resolved incident notifications, such as an identification of the similar incident notification, a reason indicating a similarity or difference between the incident notification and the similar incident notification, and an action previously executed to resolve the similar incident notification. In other implementations, the machine-learning-based model may be configured to identity one or more similar unresolved incident notifications (e.g., notifications pending in a queue), enabling the security analyst to select such unresolved incident notifications to be handled in the same manner as the incident notification. As a result, the handling of incident notifications (and similar incident notifications) may be carried out in an accurate, consistent, and efficient manner.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
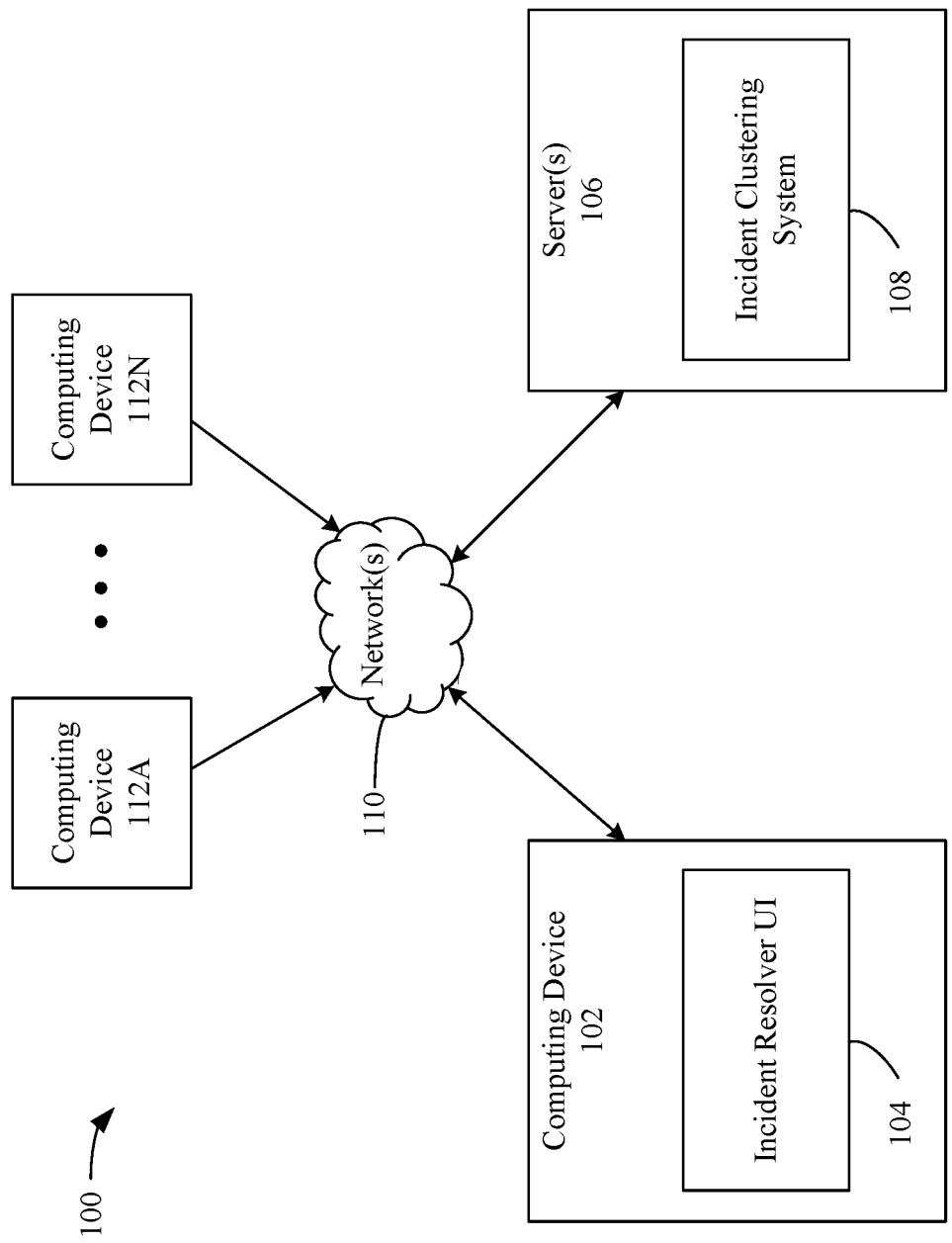
FIG. 1 shows a block diagram of a system for clustering incident notifications in a computing environment, according to an example implementation.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

As noted in the Background section above, incident management systems provide industry professionals with the ability to view and respond to incident reports, such as by investigating whether the report was generated due to benign or malicious activity. For instance, in an information technology (IT) setting, security analysts may receive incident reports corresponding to a wide range of activities occurring on various systems connected on a cloud-computing network. Analyzing each incident report in a timely manner is desired as certain incidents may comprise potential cyberthreats to one or more systems. Incident reports relating to cyberthreats are often analyzed as standalone cases, without correlating them to other potential cyberthreats. As a result, the resolution of such incident reports may be improperly or inconsistently handled, leading to a reduction in the overall quality and accuracy in the handling of potential cyberthreats.

While incidents of the same type may be grouped, such grouping based on the same incident type typically does not include grouping incidents accurately. Where incidents are not grouped appropriately, the security analyst responsible for handling the incident may misinterpret or inadvertently disregard a cyberthreat on the network. In addition, even in systems where different incidents of the same type may be grouped, the security analyst must still view and resolve each incident report separately, potentially leading to inconsistent and improper handling.

In another technique, incident reports may be prioritized based on an importance to the organization in which the report was generated, which may enable the security analyst to focus his or her attention on incidents deemed to be relatively important. However, assigning priorities to different incidents in an accurate manner often fail, for instance where the prioritization algorithm includes improper assumptions. In addition, even where prioritization techniques are implemented, each incident is still handled separately, as discussed above.

As both the number of connected systems and the number of potential cyberthreats increases, the greater the need for highly knowledgeable cybersecurity experts to resolve such potential threats in an accurate and efficient manner. However, due to a shortage in cybersecurity experts to resolve these incidents, along with rapidly evolving cloud platforms and hacking tools, a widening gap has formed between the security needs of organizations and resources available to address those needs. As a result, security analysts are typically required to address a larger number of potential threats than the analysts can properly handle, leading to potential vulnerabilities and attacks on the cloud-computing network.

An organization may have thousands of servers and thousands of user computers (e.g., desktops and laptops) connected to their network. The servers may each be a certain type of server such as a load balancing server, a firewall server, a database server, an authentication server, a personnel management server, a web server, a file system server, and so on. In addition, the user computers may each be a certain type such as a management computer, a technical support computer, a developer computer, a secretarial computer, and so on. Each server and user computer may have various applications installed that are needed to support the function of the computer. Incident management systems may continuously and automatically monitor any of these servers and/or computers connected to the network for proper operation and generate an incident notification upon detecting a potential issue or threat on one or more devices or the network itself. Each time an incident report is generated, a security analyst reviews the report to determine how to resolve the report, such as by elevating a severity level, resolving the report as a false positive, etc., requiring the analyst to expend time and resources with each separate report.

Implementations described herein address these issues through an incident system configured to cluster incident reports in a computing environment. In implementations, the system generates a feature set based on a particular incident notification. The feature set may be provided as an input to a machine-learning engine that applies a model to identify similar incident notifications in the computing environment. For instance, the machine-learning model may be configured to identify similar notifications that a security analyst or other user has already resolved or may identify similar notifications that have not yet been resolved (e.g., notifications pending in a queue). The system may enable the analyst to select actions taken in response to similar resolved incidents to resolve the incident notification, and/or select one or more similar unresolved incident notifications to be resolved along with the incident notification.

In this manner, the clustering of incident notifications may enable a security analyst to resolve one or more pending incident notifications in an efficient, accurate, and consistent way. In particular, by enabling a machine-learning engine to identify similar incidents that were previously resolved along with information associated with each incident (e.g., a reason indicating a similarity or difference and/or an action executed to resolve the notification), the analyst may readily determine whether to apply the same action to resolve the incident notification, thereby increasing the speed and accuracy at which notifications are resolved. As a result, the analysist's productivity may be increased, as well as increasing the overall security of the computers and/or networks for which the analyst is responsible for maintaining. For instance, notifications comprising potential cyberthreats may be detected and resolved quickly, which may reduce the risk of an intruder maliciously obtaining access to any of the computers, obtaining compromising sensitive data, installing malicious software, etc. As a result, operation of the computers on the network, as well as the network itself, may be secured.

Still further, example embodiments may enhance a graphical user interface (GUI) of incident management systems. For instance, the GUI of an application (such as a web application) utilized by security analysts may enable the analysts to easily determine which other incident notifications are similar in nature to an incident notification that is currently being presented in the interface. Based on information identified by the machine-learning engine and provided in the GUI, the security analyst can interact with a interactive control of the GUI to apply the same actions across a plurality of the similar unresolved incidents without having to separately open each separate incident notification. Furthermore, where the similar incident notification is a previously resolved incident notification, the GUI may automatically display information corresponding to the previously resolved notification, enabling the analyst to view such information without separately searching, navigating to, and opening the previously resolved notification to determine how similar incidents were previously handled. As a result, the GUI of incident management systems may be further enhanced, further leading to increased productivity and consistency when resolving incident notifications.

Example embodiments will now be described that are directed to techniques for clustering incidents. For instance, FIG. 1 shows a block diagram of an example system 100 for clustering incidents in a computing environment. As shown in FIG. 1, system 100 includes computing device 102, server 106, computing devices 112A-112N, and network 110. In an example embodiment, server 106 is configured to detect, log, and/or manage incidents generated with respect to computing devices 112A-112N or network 110. Computing device 102 may comprise a computing device associated with a security analyst for accessing, viewing, and/or resolving such incidents through a suitable interface. Though computing device 102 and computing devices 112A-112N may be separate devices, in an example embodiment, computing device 102 and computing devices 112A-112N may be included as node(s) or virtual machines in one or more computing devices.

Computing device 102, computing devices 112A-112N, and server 106 are communicatively coupled via network 110. Network 110 may comprise one or more networks such as local area networks (LANs), wide area networks (WANs), enterprise networks, the Internet, etc., and may include one or more of wired and/or wireless portions. Computing device 102, computing devices 112A-112N, and server 106 may communicate with each other via network 110 through a respective network interface. In an embodiment, computing device 102, computing devices 112A-112N, and server 106 may communicate via one or more application programming interfaces (API). Each of these components will now be described in more detail.

Computing devices 112A-112N may comprise, for example, a network-accessible server infrastructure. In an embodiment, computing devices 112A-112N may form a network-accessible server set, such as a cloud computing server network. For example, each of computing devices 112A-112N may comprise a group or collection of servers (e.g., computing devices) that are each accessible via a network such as the Internet (e.g., in a "cloud-based" embodiment) to store, manage, and process data. Each of computing devices 112A-112N may comprise any number of computing devices, and may include any type and number of other resources, including resources that facilitate communications with and between the servers, storage by the servers, etc. (e.g., network switches, storage devices, networks, etc.). In an embodiment, computing devices 112A-112N may comprise customer impacting computing equipment, such as computing equipment at a customer's physical location, computing equipment virtually accessible by a customer, or computing equipment otherwise relied upon or used by a customer.

Each of computing devices 112A-112N may be configured to execute one or more services (including microservices), applications, and/or supporting services. A "supporting service" is a cloud computing service/application configured to manage a set of servers (e.g., a cluster of servers in servers) to operate as network-accessible (e.g., cloud-based) computing resources for users. Examples of supporting services include Microsoft® Azure®, Amazon Web Services™, Google Cloud Platform™, IBM® Smart Cloud, etc. A supporting service may be configured to build, deploy, and manage applications and services on the corresponding set of servers. Each instance of the supporting service may implement and/or manage a set of focused and distinct features or functions on the corresponding server set, including virtual machines, operating systems, application services, storage services, database services, messaging services, etc. Supporting services may be written in any programming language. Each of computing devices 112A-112N may be configured to execute any number of supporting service, including multiple instances of the same supporting service.

In another embodiment, computing devices 112A-112N may include the computing devices of users (e.g., individual users, family users, enterprise users, governmental users, etc.) that are managed by an administrator. Computing devices 112A-112N may include any number of computing devices, including tens, hundreds, thousands, millions, or even greater numbers of computing devices. Each computing device of computing devices 112A-112N may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), a gaming console, or a server.

In system 100, server 106 executes an incident clustering system 108 for managing incidents received by server 106, according to an example embodiment. Server 106 may represent a processor-based electronic device capable of executing computer programs installed thereon, and incident clustering system 108 may comprise such a computer program that is executed by server 106. In an embodiment, server 106 comprises a desktop computer, server, or other non-mobile computing platform that is capable of executing computing programs. An example desktop computer that may incorporate the functionality of server 106 will be discussed below in reference to FIG. 8. Although server 106 is shown as a standalone computing device, in an embodiment, server 106 may be included as a node(s) in one or more other computing devices (not shown), or as a virtual machine.

Incident clustering system 108 may, for example, comprise an incident management system configured to manage incidents on network(s) 110 or any of computing devices 112A-112N. Incident clustering system 108 may implement a security information and event management (SIEM) service that combines a security information management (SIM) service and security event management (SEM) service. Microsoft® Azure® Security Center is one example of a SIEM service that may implement features and techniques described herein. Incident clustering system 108 may be configured to provide real-time monitoring and management of incident notifications in system 100. Incident clustering system 108 may implement a cloud-based incident management service (e.g., a service executing on one or more servers to monitor and/or manage incident notifications) in some examples. In other examples, incident clustering system 108 may be implemented on a local computer (e.g., on computing device 102) to monitor potential cyberthreats related to the local computer.

Incident clustering system 108 may manage generated incidents, identify similar incidents to the generated incidents, and enable a user to execute one or more actions to resolve unresolved incidents. In implementations, incident clustering system 108 may comprise a machine-learning-based model to identify similar incident notifications based on a feature set corresponding to a particular incident notification. Incident clustering system 108 may also be configured to log actions of one or more users (e.g., security analysts) operating computing device 102 to resolve incidents. In such implementations, incident clustering system 108 may be configured to cluster incidents based on learned behaviors specific to one or more users (e.g., a group of users).

Incidents, for instance, may comprise any type of incident, including but not limited to, incidents generated by computing devices 112A-112N, network 110, or server 106. In an embodiment, incidents may also be generated manually by a user of any computing device coupled to network 110. In examples, incidents may comprise security events relating to any computing device on network 110, or network 110 itself, such as information technology incidents. Information technology incidents may be generated by monitoring activity on any of the computing devices or network 110.

In implementations, incidents may comprise potential cyberthreats to any connected resource or service, network breaches, or other potential exploitations of vulnerabilities related to network 110. For example, incidents may comprise an alert related to an infrastructure as a service (IaaS) associated with network 110, such as one or more cloud-computing resources provided by any one of computing devices 112A-112N. In another example, incidents may be generated based on a potential threat to one or more platform as a service (PaaS) resources, such as a storage resource, a keyhold resource (e.g., a security key repository or the like), a network resource, or any other resource accessible via network 110 (such as a cloud-based resource). For instance, an incident notification may be generated based on an attempted, unauthorized, or otherwise potentially improper access (or attempted access) of sensitive information within such a resource, or accessing a directory or file outside of a user's scope of permitted access. In some other instances, PaaS resources may also comprise one or more web-based applications, such as a website builder application. In such an example, incidents may be generated based on a potential attacker transmitting repeated requests to the web application in an attempt to prevent others from accessing the same application (e.g., by causing a disruption of service). In some other implementations, incidents may be generated based on potential threats to one or more software as a service (SaaS) resources coupled to network 110, such as a word processing application, a spreadsheet application, an email application, a customer-facing application, etc. Such incidents may include, but are not limited to, unwanted email (e.g., spam email), viruses, malware, denial of service (DoS) attacks, etc.

In yet other example embodiments, incident notifications may include other attempts to breach a resource coupled to network 110, such as a brute force attack to gain access to a protected or secured resource. In other examples, incident notifications may comprise attempts to execute malicious commands or code, create vulnerabilities on a resource (e.g., by opening a port or other access mechanism), or any other abnormal or malicious activity detected by an alert provider such as a firewall service, an antivirus service, etc. However, these are examples only and are not intended to be limiting, and persons skilled in the relevant art(s) will appreciate that an incident may comprise any event occurring on or in relation to a computing device, system or network. In implementations, each generated incident notification may be detected by or transmitted to incident clustering system 108 of server 106.

Computing device 102 may represent a processor-based electronic device capable of executing computer programs installed thereon. In one embodiment, computing device 102 comprises a mobile device, such as a mobile phone (e.g., a smart phone), a laptop computer, a tablet computer, a netbook, a wearable computer, or any other mobile device capable of executing computing programs. Computing device 102 comprises an incident resolver user interface (UI) 104. In an example embodiment, incident resolver UI 104 may provide a user with the ability to view, select, and/or resolve incident notifications received by incident clustering system 108. In some implementations, a user may select a particular incident notification through incident resolver UI 104. Incident resolver UI 104 may also enable the user to view one or more incident notifications that are similar to the particular incident notification selected by the user. For example, based on the incident notification selected by the user through incident resolver UI 104, incident clustering system 108 may identify one or more similar resolved incident notifications and/or one or more similar unresolved incident notifications. In some examples, incident resolver UI 104 may be configured to present additional information for each similar resolved and/or unresolved incident notification, such as a reason indicating a similarity or difference, the identity of an action taken to resolve each of the previously resolved similar incident notifications, and/or any other information that may enhance the efficiency of the user in resolving the particular incident notification. In some other implementations, incident resolver UI 104 may enable a user to select one or more similar unresolved incident notifications to resolve along with the particular incident notification.

In some example embodiments, computing device 102 may be configured to access one or more remote services or servers, such as server 106, via a website, a web-based application, or a locally installed application. For instance, incident resolver UI 104 may comprise a web-based application that communicates with incident clustering system 108 enabling a security analyst to view incident notifications and similar incident notifications, as well resolve such notifications with one or more appropriate actions. In some examples, incident resolver UI 104 may communicate with incident clustering system 108 through an appropriate API.

Figure 2:
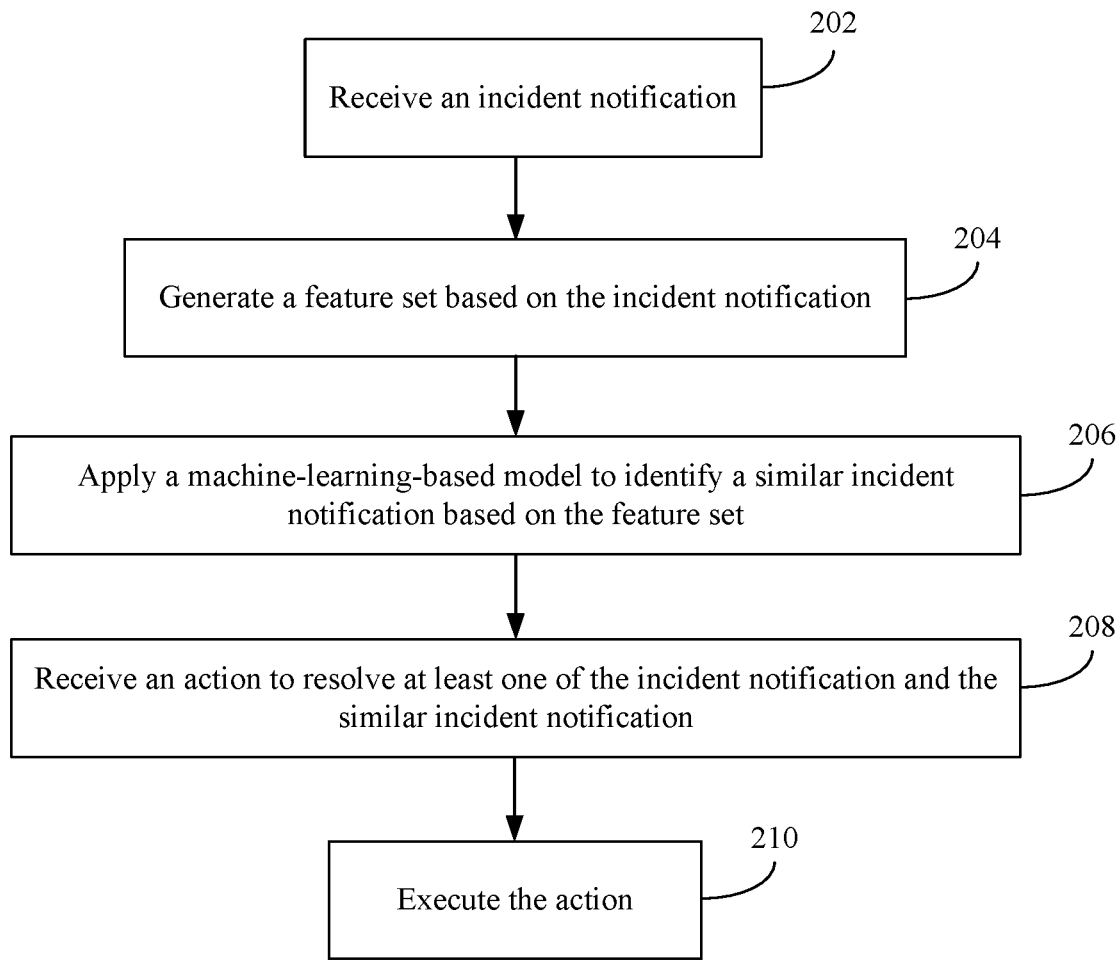
FIG. 2 shows a flowchart of a method for clustering incident notifications in a computing environment, according to an example embodiment.
Figure 3:
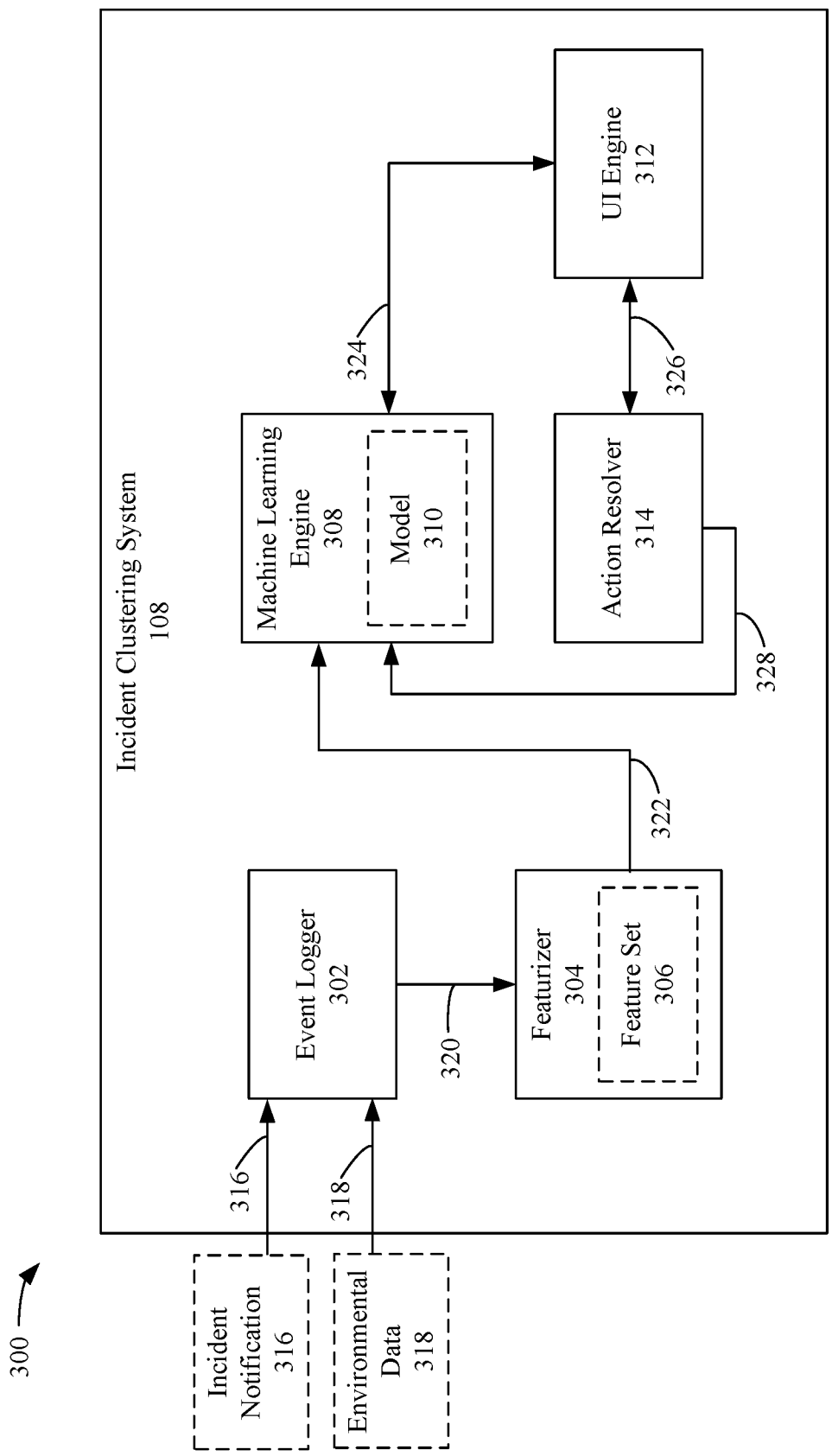
FIG. 3 shows a block diagram of an incident clustering system, according to an example embodiment.

Accordingly, in example embodiments, incident clustering system 108 may be configured to cluster incident notifications in a computing environment in various ways. For instance, FIG. 2 shows a flowchart 200 of a method for clustering incident notifications in a computing environment, according to an example embodiment. In implementations, the steps of flowchart 200 may be implemented by incident resolver UI 104 and/or incident clustering system 108. FIG. 2 is described with reference to FIG. 1 and FIG. 3. FIG. 3 shows a block diagram of incident clustering system 108. Incident clustering system 108 includes an event logger 302, a featurizer 304, a machine learning engine 308, a user interface (UI) engine 312, and an action resolver 314. As shown in FIG. 3, featurizer 304 may comprise a feature set 306. Machine learning engine 308 may be configured to generate, train, and/or apply a model 310 to identify one or more similar incident notifications. Other structural and operational embodiments will be apparent to persons skilled in the relevant art(s) based on the following discussion regarding flowchart 200, system 100 of FIG. 1, and incident clustering system 108 of FIG. 3.

Flowchart 200 begins with step 202. In step 202, an incident notification is received. For example, event logger 302 described with reference to FIG. 3 may receive an incident notification 316. Incident notification 316 may comprise any type of notification or report relating to a potential threat or security incident on any resource or service coupled to network 110 as described herein. Incident notification 316 may include information associated with the generated alert, such as a timestamp, location, subscription, storage, an application, or any other identifier of a resource associated with the alert. Event logger 302 may further be configured to receive environmental data or contextual data 318 related to incident notification 316, such as information related to process creation, telemetry, or a network associated with incident notification 316 as will be described in greater detail below. In some implementations, each incident notification 316 may be assigned a spot in a queue, such as a sequence number or other identifier, such that incident clustering system 108 may uniquely identify and/or sort a plurality of incident notifications based on an order in which the notifications are generated.

Event logger 302 may receive incident notification 316 in a variety of ways. For instance, event logger 302 may receive an incident notification in real-time or near real-time as the notification is generated, may receive incident notifications in batches, or may receive incident notifications at predetermined time intervals. In implementations, event logger 302 may execute one or more monitoring applications (e.g., web applications, locally installed applications, etc.) or utilize a suitable API to monitor and/or collect incident notifications relating to network 110. Event logger 302 may be enabled to collect incident reports from a variety of alert providers. Alert providers may include any service, application, or computing device capable of detecting a potential threat and generating an incident notification relating to any of the resources, applications, services, etc. discussed herein. For instance, event logger 302 may be configured to interact with a variety of alert providers to collect incident notifications, such as a firewall service, an antivirus service, an anti-malware service, a cloud security application, or other alert providers to receive incident notifications corresponding to a potential threat.

In some implementations, event logger 302 may be configured by an administrator or security analyst to identify and/or subscribe to receive incident notifications from one or more alert providers. For example, event logger 302 may be configured to collect incident notifications for only some types of cyberthreats or threats occurring on certain resources identified by an administrator. Event logger 302 may store each received incident notification 316 in a storage or memory device. Such a memory or storage may be part of, or local to, server 106 in some example embodiments. In other examples, the memory or storage may be located remotely. In examples, event logger 302 may store incident notifications in a uniform format or structure. For instance, incident notification 316 may undergo initial processing to normalize information contained therein to generate a set of information in a format or structure that is common to other incident notifications, even if event logger 302 is configured to receive notifications from a plurality of different alert providers. In this manner, event logger 302 may collect and store information irrespective of the identity of the alert provider that generated the notification.

In step 204, a feature set is generated based on the incident notification. For instance, with reference to FIG. 3, featurizer 304 may receive 320 incident notification 316 from event logger 302 and generate feature set 306 based thereon. In some implementations, the set of features may be based on any questions, topics, fields, etc. that a security analyst may analyze when determining how to respond to an incident notification, including whether the incident notification is a valid notification, a severity level associated with the notification, and an action to execute to resolve the notification. For instance, featurizer 304 may generate one or more features for each received incident notification relating to a location (such as a virtual and/or a physical location within an organization), a user identifier, a subscription, a timestamp, a resource identifier (e.g., a storage, application, platform, etc.) associated with incident notification 316, an Internet Protocol (IP) address of the resource, an IP address of the potential attacker, etc.

Additionally, the set of features may comprise one or more features based on aggregated or pre-processed data, such as a number or frequency of alerts occurring on the same resource in a particular period of time (e.g., in the last hour, day, week, etc.). In some other instances, the generated features may also comprise an indication or a flag identifying if the incident notification is the first alert occurring on the resource. For example, featurizer 304 may implement one or more data mining techniques to preprocess raw data associated with one or more features to generate a feature set for a particular incident notification. In one example, featurizer 304 may generate a feature set for incident notification 316 based on statistics associated with one or more features. Statistical analyses may include, but are not limited to data aggregation, multiplication, compilation, determining standard deviations, a quantity of alerts in a particular time period, an average number of alerts in a particular time period, etc. In other words, featurizer 304 may be configured to extract one or more meaningful features for feature notification 316 from raw or unprocessed notification data. In some other implementations, featurizer 304 may perform a noise cleaning and/or a normalization operation during generation of feature set 306.

In some example embodiments, featurizer 304 may generate feature set 306 using environmental data 318. Accordingly, feature set 306 may comprise one or more environmental or contextual features related to incident notification 316. In some examples, environmental data 318 may include one or more data feeds corresponding to an environment in which incident notification 316 was generated. In examples, environmental or contextual features may be generated from information or data feeds separate from incident notification 316. For instance, environmental data 318 may comprise a data feed relating to a process creation, telemetry, a network, a hardware configuration, or a geo-location associated with incident notification 316. A feature based on process creation may identify one or more processes currently executing in the computing environment in which incident notification 316 was generated. As an illustrative example, a feature based on process creation may indicate an operating system, software type, version, etc. of the resource for which incident notification 316 was generated. In some other examples, a process creation data feed may identify a plurality of other processes executing in the environment (e.g., other software or applications that are executing). In some other implementations, features based on telemetry may be include within feature set 306, such as a time associated with one or more alerts (e.g., whether the notification was generated at or around the same time as another notification), subscription information associated with the computing environment, etc. Features based on network information may indicate whether the same IP address has generated a plurality of incident notifications at or around the same time, the occurrence of an increased or abnormal number of failed communications to or from resources coupled to network 110, an indication of whether a plurality of resources are accessing malicious or other potentially harmful websites or resources that may suggest that incident notifications associated with the plurality of resources are similar.

Features may also be generated based on a hardware configuration of the computing environment in which incident notification 318 was generated. For instance, a feature based on a hardware configuration may identify any one or more of a type, brand, make and/or model, processor, a computer component or peripheral (internal or external), etc. of a computing device associated with incident notification 316. In other examples, features based on a geo-location associated with incident notification 316 may indicate, for instance, a geographic location (e.g., a physical location) of a computing device associated with incident notification 316. For example, a geographic location may indicate a city, county, stage, country, and/or geographical coordinates of the computing environment in which incident notification 316 was generated. In some implementations, a geolocation may be determined based on an IP address of a computing device associated with incident notification 316, a Global Positioning Sensor (GPS) of the computing device, or using any other technique appreciated by those skilled in the relevant arts. Accordingly, feature set 306 may be generated not only from incident notification 316, but also from information (e.g., environmental data 318) received separate from incident notification 316 in examples.

In implementations, the type of features may be based on an automatic determination and/or a user input (e.g., an input from a security analyst). The type of features may be selected based on one or more data insights related to the type, format, and content of features most important and/or relevant to machine learning engine 308 to identify similar incident notifications. It is noted that the features described herein is illustratively only, and featurizer 304 may generate a set of features based on any information included within incident notification 316 and/or from data feeds/sources outside of incident notification 316.

In step 206, a machine-learning-based model is applied to identify a similar incident notification based on the feature set. For example, with reference to FIG. 3, machine learning engine 308 may apply a model 310 to identify one or more similar incident notifications (e.g., notifications similar to incident notification 316) based on feature set 306. Machine learning engine 308 may apply model 310 in a variety of ways to identify a similar incident notification. In examples, model 310 may be configured to implement one or more algorithms to generate a score or other measure of similarity between a plurality of incident notifications based on feature set 306 and training data. In one example, model 310 may implement a score model, a distance model, and/or other similarity metric to determine a likelihood that two incident notifications are similar. Model 310 may implement one or more of such algorithms discussed herein to identify which features or feature sets are important in determining whether multiple incident notifications are similar to each other.

In some examples, model 310 may implement a decision tree and/or a deep learning model in accordance with example embodiments. Model 310 is not limited to these illustrative machine-learning models, but may also implement any other known or future developed machine learning model appreciated by those skilled in the relevant arts to identify similar incident notifications. Such models include, but are not limited to instance-based algorithms, regression analyses (e.g., linear regression, logic regression), regularization algorithms, classifier-based algorithms (e.g., naive Bayes algorithms, K-nearest neighbor (KNN) algorithms, etc.), support vector machine (SVM) algorithms, clustering algorithms (e.g., k-means algorithms), random forest algorithms, dimensionality reduction algorithms, gradient boosting algorithms, etc. In some example embodiments, model 310 may implement a plurality of machine-learning-based algorithms and is not limited to only one implementation.

In example embodiments, machine learning engine 308 is configured to apply model 310 to identify one or more similar incident notifications by analyzing feature set 306 associated with incident notification 316. For instance, based on feature set 306 (which may comprise features extracted from incident notification 316 and/or environmental features extracted from environmental data 318), machine learning engine 308 may identify other incident notifications that are determined to be similar to incident notification 316. As discussed above, in some implementations, machine learning engine 308 may be configured to determine a distance or a similarity measure between incident notification 316 and one or more other incident notifications. Depending on the particular feature set and incident notification 316, in illustrative examples, machine learning engine 308 may identify similar incident notifications that were generated at or around the same time as incident notification 316. In other examples, machine learning engine 308 may identify similar incident notifications occurring on the same resource as incident notification 316. These examples are not intended to be limiting, as machine learning engine 308 may identify similar incidents in any other manner based on feature set 306. As will be discussed in greater detail below, similar incident notifications identified by machine learning engine 308 may include a similar resolved incident notification (e.g., an incident notification that a security analyst has previously resolved by executing a corrective action, marking as a false positive, etc.) and/or may include a similar unresolved incident notification (e.g., an incident notification that is pending in a queue in incident clustering system 108).

In one non-limiting illustrative example, machine learning engine 308 may determine, based on one or more features (e.g., a user identifier, an IP address, a resource identifier, etc.) that a particular incident notification is similar to another incident notification for a number of reasons, such as the incident notifications being of the same type despite occurring on different resources. In another illustrative example, incident notifications may be similar where the resource that is potentially attacked is the same resource. In yet another illustrative example, incident notifications may be deemed similar where the potential attacker's IP address is the same as other incident notifications.

As discussed above, feature set 306 may also comprise one or more features based on an environment in which incident notification 316 was generated. Accordingly, machine learning engine 308 may identify one or more similar incident notifications based on such environmental features, including but not limited to features related to process creation, telemetry, and/or a network related to incident notification 316. As an illustrative example utilizing a process creation feature, machine learning engine 308 may determine two incident notifications are similar where both environments were executing the same process(es), even though the incident notifications were generated for different resources. In another illustrative example, machine learning engine 308 may identify two incident notifications as dissimilar where the operating systems associated with each computing environment is different, even if the notifications were generated relatively close in time. Accordingly, machine learning engine 308 may identify similar incidents not only based on features extracted from incident notification 316, but also based on environmental or contextual features extracted separate from incident notification 316. In this way, machine learning engine 308 may identify similar incident notifications in a more accurate manner and enhancing a security analyst's efficiency in resolving incident notifications.

In implementations, model 310 may be trained in various ways. In some example embodiments, model 310 may be trained using a supervised learning and/or unsupervised learning technique. For instance, model 310 may be trained based on training data inputted by a user (e.g., a security analyst), such as manual identifications of one or more features that may indicate that two incident notifications are similar. In some other instances, a user input may indicate one or more features that indicate that two incident notifications are not similar. In yet other example embodiments, model 310 may be trained based on a user input identifying a feature set and an associated label (such as a similarity metric, a distance score, etc.).

In some other instances, model 310 may be trained 328 based on a user's (or plurality of users') prior resolution of incident notifications. For example, model 310 may determine that a user commonly treats or resolves incident notifications associated with a certain feature set in a similar manner Based on such information, model 310 may be trained to identify incident notifications comprising a similar set of features as similar incident notifications. Training of model 310 is not limited to the above illustrative examples, and may encompass any other manner of training known and appreciated by those skilled in the relevant art.

In implementations, model 310 may also be continuously and automatically trained based on the actions of users of incident clustering system 108. For instance, as users of incident clustering system 108 respond to incident notifications (e.g., by marking as a false positive, elevating a severity level, taking another action to resolve the notification, etc.), model 310 may identify other incident notifications, such as incident notifications comprising similar features as similar to the incident notification to which the user is responding. In some other examples, where the user has selected one or more similar incident notifications via incident resolver UI 104 to be resolved in the same way as incident notification 316, model 310 may be trained and reinforced based on the user's selection of the similar notifications. In other scenarios where the user does not select a similar incident notification identified by model 310 to be resolved in the same way as incident notification 316, model 310 may be retrained. In this manner, as the number of resolved incident notifications increases, model 310 may be further refined, thereby increasing the accuracy of model 310 in identifying similar (or different) incident notifications.

It is noted in some embodiments, model 310 may be trained in a manner personal to a particular, or may be trained based on a plurality of users. For example, model 310 may be trained based on a particular individual's manner of resolving incident notifications, or may be trained based on the behaviors of a group of users (e.g., an IT staff or a team of security analysts) or an entire organization of users. In this manner, model 310 may be personalized and/or may leverage behaviors learned across a larger group of users.

In step 208, an action to resolve at least one of the incident notification and the similar incident notification are received. For example, with continued reference to FIG. 3, machine learning engine 308 may provide 324 an identification of the similar incident notification to UI engine 312. UI engine 312 is configured to generate a user interface (e.g., a web-based interface or any other application interface) that a user, such as a security analyst, may interact with via incident resolver UI 104. A non-limiting example of an illustrative user interface is described in more detail below with reference to FIG. 7.

In implementations, UI engine 312 may generate an interface through which a user can view a variety of types of information when accessing incident clustering system 108 for incident resolution. In some example implementations, a user may interact with incident resolver UI 104 to input login credentials to gain access to incident clustering system 108 prior to responding to incidents. Upon gaining access, UI engine 312 may enable incident resolver UI 104 to identify a particular incident notification (e.g., incident notification 316) for resolution based on a user selection. Upon a user selection, incident resolver UI 104 may display corresponding information relating to incident notification 316, such as a user identifier, a resource name, a type of the incident notification, a location, a timestamp, etc. or any other information that may assist the user in determining how to resolve incident notification 316.

In examples, incident resolver UI 104 enables a user to input one or more actions to resolve or otherwise respond to incident notification. For instance, incident resolver UI 104 may enable a user to mark incident notification 316 as a legitimate threat, a false positive, escalate for further review, etc. In other examples, incident resolver UI 104 may enable a user to identify, raise, or decrease a severity level associated with incident notification 316. In yet other examples, incident resolver UI 104 may enable a user to take one or more corrective actions to resolve, rectify and/or remediate a potential cyberthreat, such as by blocking access to a secured resource, disabling a resource, blocking an IP address or a communication channel, etc. Such actions are illustrative only, and incident resolver UI 104 may provide any number and type of actions for a user to view and/or select to respond to incident notification 316 as will be appreciated by those skilled in the art.

Incident resolver UI 104 may be configured to also display an identification of the similar incident notification outputted by machine learning engine 308. In some instances, incident resolver UI 104 may display a similar resolved incident notification and/or a similar unresolved incident notification. In some examples, additional information associated with the similar resolved incident notification (e.g., an action taken to resolve the similar incident notification, a reason for a similarity or a difference, etc.) may be displayed in incident resolver UI 104 along with incident notification 316. In some other instances, additional information associated with similar unresolved incident notifications (e.g., a reason for a similarity or difference), as well one or more selectable user interface elements to select the similar unresolved incident notification for resolution along with incident notification 316.

In step 210, the action received via the user interface is executed. For instance, with reference to FIG. 3, action resolver 314 may receive 326 one or more user actions received by UI engine 312 via incident resolver UI 204 to respond to an incident notification. As discussed herein, action resolver 314 may execute an action to resolve incident notification 316 and/or one or more similar unresolved incident notifications identified by machine learning engine 308. In example embodiments, action resolver 314 may comprise a suitable execution engine implemented in server 306 and/or any other computing device or service coupled to network 110 to resolve the selected incident notifications selected via incident resolver UI 104. In some implementations where a plurality of incident notifications (e.g., incident notification 316 and one or more similar unresolved incident notifications) are selected by the user for resolution, action resolver 314 may execute the one or more actions for each selected incident notification sequentially (e.g., in a predetermined order based on a timestamp, a priority, a resource hierarchy, etc.), or may execute each action in parallel to resolve the plurality of incident notifications.

Figure 4:
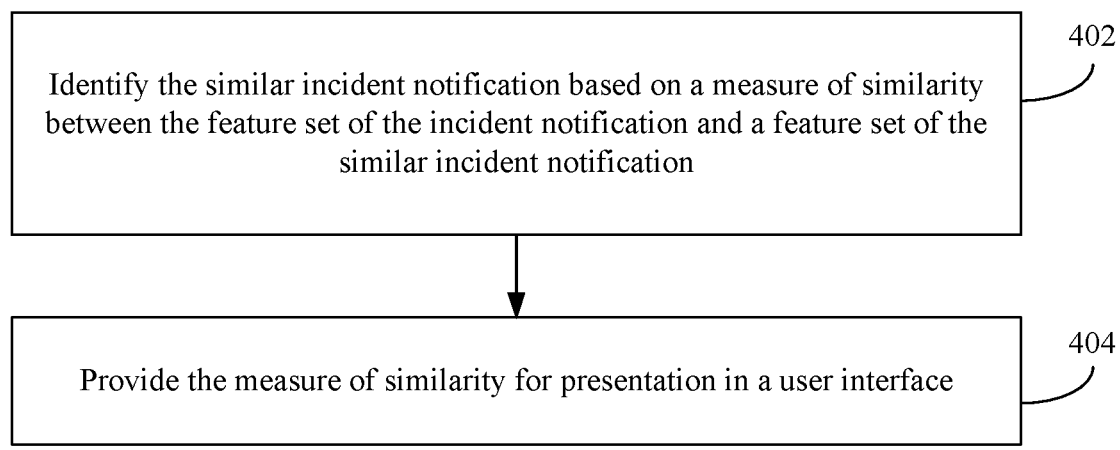
FIG. 4 shows a flowchart of a method for identifying a similar incident notification based on a measure of similarity, according to an example embodiment.

As described above, in an example embodiment, machine learning engine 308 may identify a similar incident notification based on a similarity metric. For instance, FIG. 4 shows a flowchart 400 for identifying a similar incident notification based on a measure of similarity, according to an example embodiment. In an embodiment, flowchart 400 may be implemented by incident clustering system 108, as shown in FIGS. 1 and 3. Other structural and operational embodiments will be apparent to persons skilled in the relevant art(s) based on the following discussion regarding flowchart 400.

Flowchart 400 begins with step 402. In step 402, a similar incident notification is identified based on a measure of similarity between a feature set of an incident notification and a feature set corresponding to the similar incident notification. For instance, with reference to FIG. 3, machine learning engine 308 may apply model 310 to identify a similar incident notification based on a measure of similarity. Model 310 may be configured to apply a suitable algorithm, examples of which are discussed above, to determine a measure of similarity between feature set 306 associated with incident notification 316 and a feature set corresponding to a similar incident notification. For example, the measure of similarity may comprise a confidence measure, such as a value indicating a level of confidence that two incident notifications are similar. In some example embodiments, the measure of similarity may comprise a score or distance between two incident notifications, such as a value indicating how similar (or dissimilar) the two incident notifications are. For example, the measure of similarity may be higher where incident notifications are likely to be similar, whereas the measure of similarity may be lower where incident notifications are likely to be different. In some other examples, the measure of similarity may comprise a non-numerical value, such as a letter grade or other ranking to distinguish between similar and non-similar incident notifications. In implementations, the measure of similarity may be determined for similar resolved incident notifications and similar unresolved incident identified by model 310.

In some instances, model 310 may be configured to identify similar incident notifications that exceed a threshold measure of similarity. For instance, model 310 may only output similar incident notifications comprising a score or distance (or other measure) that exceeds a predetermined value. In this way, a user may be presented with similar incident notifications comprising a relatively high similarity metric, which may reduce the likelihood that the user becomes distracted with incident notifications not likely to be relevant to incident notification 316.

In step 404, a measure of similarity is provided for presentation in a user interface. For instance, with reference to FIG. 3, UI engine 312 may provide, for presentation in incident resolver UI 104, the measure of similarity corresponding to each identified similar incident notification. For instance, incident resolver UI 104 may be configured to display, via computing device 102, each similar incident notification identified by model 310 that is similar to incident notification 316, along with the measure of confidence associated with each similar incident notification. Incident resolver UI 104 may also be configured to display similar incident notifications in a ranked manner based on the measure of confidence (e.g., highest to lowest), such that similar incident notifications with a higher level of confidence are displayed first.

In some implementations, incident resolver UI 104 may be configured to identify a number of similar incident notifications to be displayed. For instance, a user of computing device 102 may configure a threshold measure of similarity in incident resolver UI 104, such that only similar incident notifications exceeding the threshold are presented. In some other example embodiments, incident resolver UI 104 may comprise one or more interactive user controls that enables additional similar incident notifications to be obtained from machine learning engine 308 and provided to incident resolver UI 104. In yet other implementations, incident resolver UI 104 may be configured to display a fixed number of similar incident notifications (e.g., the five most similar incident notifications with the highest measure of similarity between incident notification 316)

In this manner, a user of computing device 102 may configure incident resolver UI 104 in a variety of ways to display an appropriate type and/or number of similar incident notifications, which may enhance the user's ability to more determine whether to apply the same action as previously taken (in event of a similar resolved notification), or apply a common action to resolve incident notification 316 and one or more similar unresolved notifications. As a result, such clustering and display of similar incident notifications may enable the user to accurately, efficiently, and consistently resolve incident notifications with reduced effort.

Figure 5:
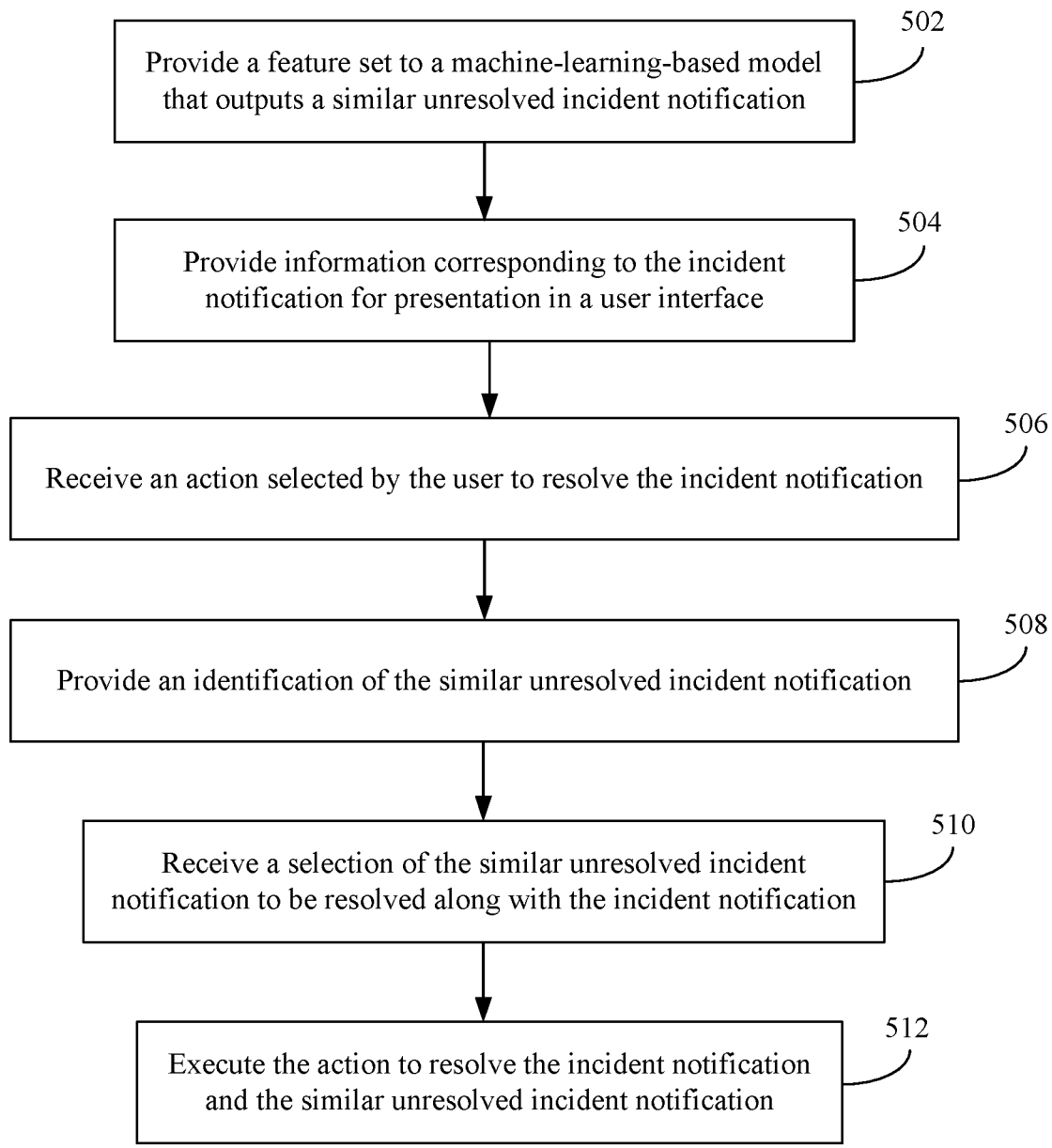
FIG. 5 shows a flowchart of a method for identifying a similar unresolved incident notification, according to an example embodiment.

As described above, in an example embodiment, incident clustering system 108 may be configured to identify one or more unresolved incident notifications similar to incident notification 316. For instance, FIG. 5 shows a flowchart 500 for identifying a similar unresolved incident notification, according to an example embodiment. In an implementation, flowchart 500 may be implemented by incident clustering system 108 as shown in FIGS. 1 and 3. Other structural and operational embodiments will be apparent to persons skilled in the relevant art(s) based on the following discussion regarding flowchart 500.

Flowchart 500 begins with step 502. In step 502, a feature set is provided to a machine-learning-based model that outputs a similar unresolved incident notification. For instance, with reference to FIG. 3, feature set 306 corresponding to incident notification 316 may be provided to model 310 to identify similar incident notifications. As described earlier, machine learning engine 308 may apply model 310 to identify one or more similar incident notifications that have not been resolved. For example, unresolved incident notifications may comprise incident notifications that is pending resolution and/or corrective action. In some instances, an unresolved incident notification may be included in a queue among other unresolved incident notifications. In some other instances, machine learning engine 308 may be configured to apply model 310 to compare (e.g., determine a measure of similarity as described herein) incident notification 316 to each unresolved incident notification in a queue of pending notifications to identify similar unresolved notifications.

In step 504, information corresponding to the incident notification is provided for presentation in a user interface. For example, with continued reference to FIG. 3, UI engine 312 may be configured to provide information associated with incident notification 316 for presentation in incident resolver UI 104. Information associated incident notification 316 may include any information, data, metadata, etc. extracted or obtained from incident notification or from environmental data 318. For instance, information associated with incident notification 316 may include, but is not limited to, a location (such as a virtual and/or a physical location within an organization), a user identifier, a subscription, a timestamp, a resource identifier (e.g., a storage, application, platform, etc.) associated with incident notification 316, an IP address of the resource or the potential attacker, etc. of the resource, an IP address of the potential attacker, or environmental data described herein. In other implementations, information associated with incident notification 316 may include any other type of information or data that a security analyst may rely upon in determining how to respond to an incident notification, including determining whether the threat is legitimate, an associated severity level in the event the threat is valid, and/or remediation actions to resolve the incident notification.

In step 506, an action selected by the user to resolve the incident notification is received. In example embodiments, step 506 of FIG. 5 may be performed in a substantially similar manner as described above with reference to step 208 of FIG. 2.

In step 508, an identification of the similar unresolved incident notification is provided for presentation in a user interface. For instance, with reference to FIG. 3, UI engine 312 may provide, for presentation in incident resolver UI 104, the identification of the similar unresolved incident notification identified by machine learning engine 308. In some implementations, machine learning engine 308 may identify a plurality of similar unresolved incident notifications, and UI engine 312 may provide an identification of each such incident notification for presentation in incident resolver UI 104 (or a subset thereof, based for example on a measure of similarity as described herein).

In some examples, information associated with each similar unresolved incident notification may also be provided for presentation in incident resolver UI 104. For instance, information associated with each similar unresolved incident notification may be similar to the information provided with respect to incident notification 316 as described above in step 504.

In step 510, a selection of the similar unresolved incident notification to be resolved along with the incident notification is received. For instance, with reference to FIG. 3, UI engine 312 may provide, via incident resolver UI 104, an interactive control element, such as a check box, a selection icon, etc. that enables a particular similar unresolved incident notification presented in incident resolver UI 104 to be resolved along with incident notification 316. For example, where a user determines that one or more similar unresolved incident notifications presented in incident resolver UI 104 should be resolved or treated in the same manner as incident notification 316, the user may interact with an appropriate interface element to identify the similar unresolved incident notification.

In step 512, the action to resolve the incident notification and the similar unresolved incident notification is executed. In implementations, step 512 of FIG. 5 may be performed in a substantially similar manner as described above in step 210 of FIG. 2. For instance, upon identifying one or more actions (e.g., identifying whether the threat is legitimate, identifying a severity level, and/or identifying a corrective action) to remediate incident notification 316 and the similar unresolved incident notification, action resolver 314 may execute the action (or plurality of actions) to resolve such incident notifications collectively. In this manner, the user need not separately engage in analyzing each incident notification that is to be resolved in the same manner, but rather may select the appropriate action or actions for incident notification 316, and apply the same action to similar unresolved incident notifications upon selection of such similar notifications. Accordingly, by enabling multiple incident notifications to be resolved with a reduced number of steps, incident clustering system may enhance the speed at which the user can resolve incident notifications, while also increasing the accuracy and consistency of their resolution.

Figure 6:
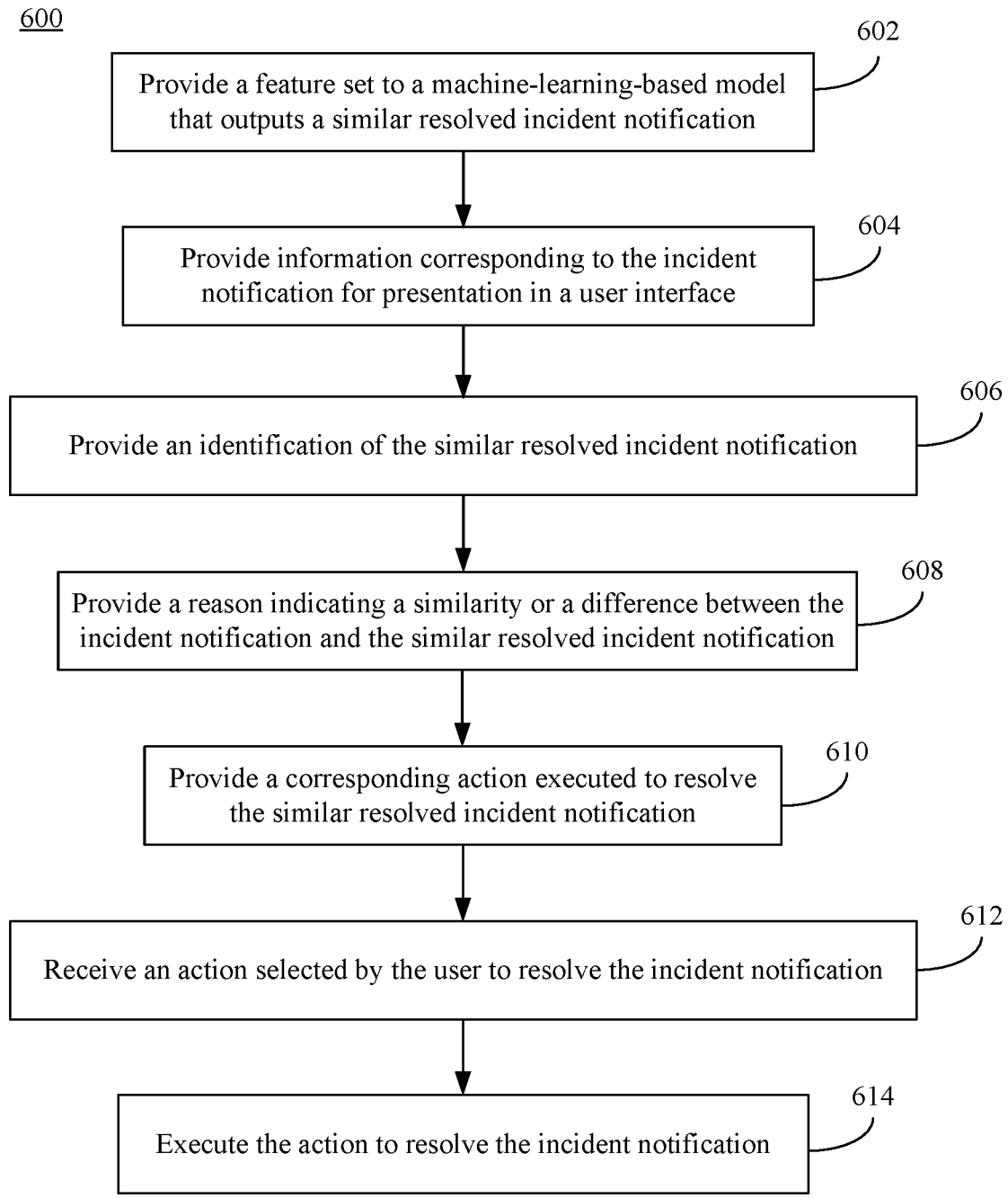
FIG. 6 shows a flowchart of a method for identifying a similar resolved incident notification, according to an example embodiment.

As described above, in an example embodiment, incident clustering system 108 may be configured to identify one or more resolved incident notifications similar to incident notification 316. For instance, FIG. 6 shows a flowchart 500 for identifying a similar resolved incident notification, according to an example embodiment. In an implementation, flowchart 600 may be implemented by incident clustering system 108 as shown in FIGS. 1 and 3. Other structural and operational embodiments will be apparent to persons skilled in the relevant art(s) based on the following discussion regarding flowchart 600.

Flowchart 600 begins with step 602. In step 602, a feature set is provided to a machine-learning-based model that outputs a similar resolved incident notification. For instance, with reference to FIG. 3, feature set 306 corresponding to incident notification 316 may be provided to model 310 to identify similar resolved incident notifications. A similar resolved notification may include a notification similar to incident notification 316 (e.g., as determined by machine learning engine 308) that a user of incident resolver UI 104 previously resolved. The previously resolved incident notification may comprise a notification that was resolved in any way as described herein, including but not limited to taking one or more actions with respect to the notification such as identifying the notification as legitimate or as a false positive, identifying an associated severity level of the notification, and/or identifying one or more actions to remediate the notification.

In step 604, information corresponding to the incident notification is provided for presentation in a user interface. In example embodiments, step 604 of FIG. 6 may be performed in a manner substantially similar to step 504 discussed with reference to FIG. 5.

In step 606, an identification of the similar unresolved incident notification is provided for presentation in the user interface. For instance, similar to step 508 of FIG. 5, UI engine 312 may provide, for presentation in incident resolver UI 104, the identification of the similar resolved incident notification identified by machine learning engine 308. Machine learning engine 308 may identify a plurality of similar resolved incident notifications, and UI engine 312 may provide an identification of each such incident notification for presentation in incident resolver UI 104 (or a subset thereof, based for example on a measure of similarity as described herein). In example implementations, information associated with each similar resolved incident notification may also be provided for presentation in incident resolver UI 104 (e.g., similar to information provided with respect to incident notification 316).

In step 608, a reason indicating a similarity or difference between the incident notification and the similar resolved incident notification are provided for presentation in the user interface. For example, with reference to FIG. 3, UI engine 312 may provide for presentation in incident resolver UI 104 a reason indicating a similarity and/or a difference between incident notification 316 and the similar resolved incident notification. In some examples, one or more similarities may be displayed. In some other examples, one or more differences may be displayed. In yet other examples, both similarities and differences may be displayed. Reasons indicating a similarity or a difference may be based on any number of attributes, such as information extracted or obtained from feature set 306 corresponding to each incident notification, information obtained from each incident notification, and/or information associated with the environment in which each incident notification was generated. For instance, machine learning engine 308 may identify a particular notification as a similar resolved notification even where the similar resolved notification occurred on a different resource, was generated by a different IP address, targeted a different user, etc. Machine learning engine 308 may be configured to output each similarity or difference to UI engine 312 for presentation in incident resolver UI 104.

It is noted that UI engine 312 is not limited to providing a reason indicating a similarity and/or difference between incident notification 316 and a similar resolved incident notification. In other examples, such as the method described with reference to flowchart 500, UI engine 312 may provide a reason indicating a similarity or difference between incident notification 316 and a similar unresolved incident notification. Accordingly, in either implementation, a user of incident resolver UI 104 may determine, based on such an indication, whether the one or more incident notifications identified by machine learning engine 308 is sufficiently similar to incident notification 316 to warrant resolution in a common manner.

In step 610, a corresponding action executed to resolve the similar resolved incident notification is provided for presentation in the user interface. For instance, with reference to FIG. 3, machine learning engine 308 may be configured to identify a corresponding action that was previously taken by a user to resolve each similar resolved incident notification. Based on such an identification of the actions previously taken, UI engine 312 may provide, for presentation in incident resolver UI 104, each such action. In this manner, incident resolver UI 104 may display the identity of one or more similar resolved incident notifications, along with a reason indicating a similarity or a difference and the action executed to resolve each notification. Based on such information presented in incident resolver UI 104, a user may quickly determine whether to apply the same action previously taken to resolve a similar incident notification to incident notification 316.

In step 612, an action selected by the user to resolve the incident notification is received. In examples, step 612 of FIG. 6 may be performed in a substantially similar manner as described above with reference to step 208 of FIG. 2. For example, based on information presented in incident resolver UI 104 (e.g., the identity of one or more similar resolved incident notifications, a reason indicating a similarity or a difference, and/or a corresponding action executed to resolve each notification), a user may quickly determine whether to apply the same action previously taken to resolve a similar incident notification to incident notification 316. As a result, incident clustering system 108 may enable a more efficient and consistent manner of resolving incident notifications.

In step 614, the action to resolve the incident notification is executed. In example embodiments, step 614 of FIG. 6 may be performed in a substantially similar manner as described above with reference to step 208 of FIG. 2.

In some example embodiments, one or more of operations of flowcharts 200, 500 and/or 600 may not be performed. Moreover, operations in addition to or in lieu of operations of flowcharts 200, 500 and/or 600 may be performed. Further, in some example embodiments, one or more of operations of flowcharts 200, 500 and/or 600 may be performed out of order, in an alternate sequence, or partially (or completely) concurrently with each other or with other operations.

Figure 7:
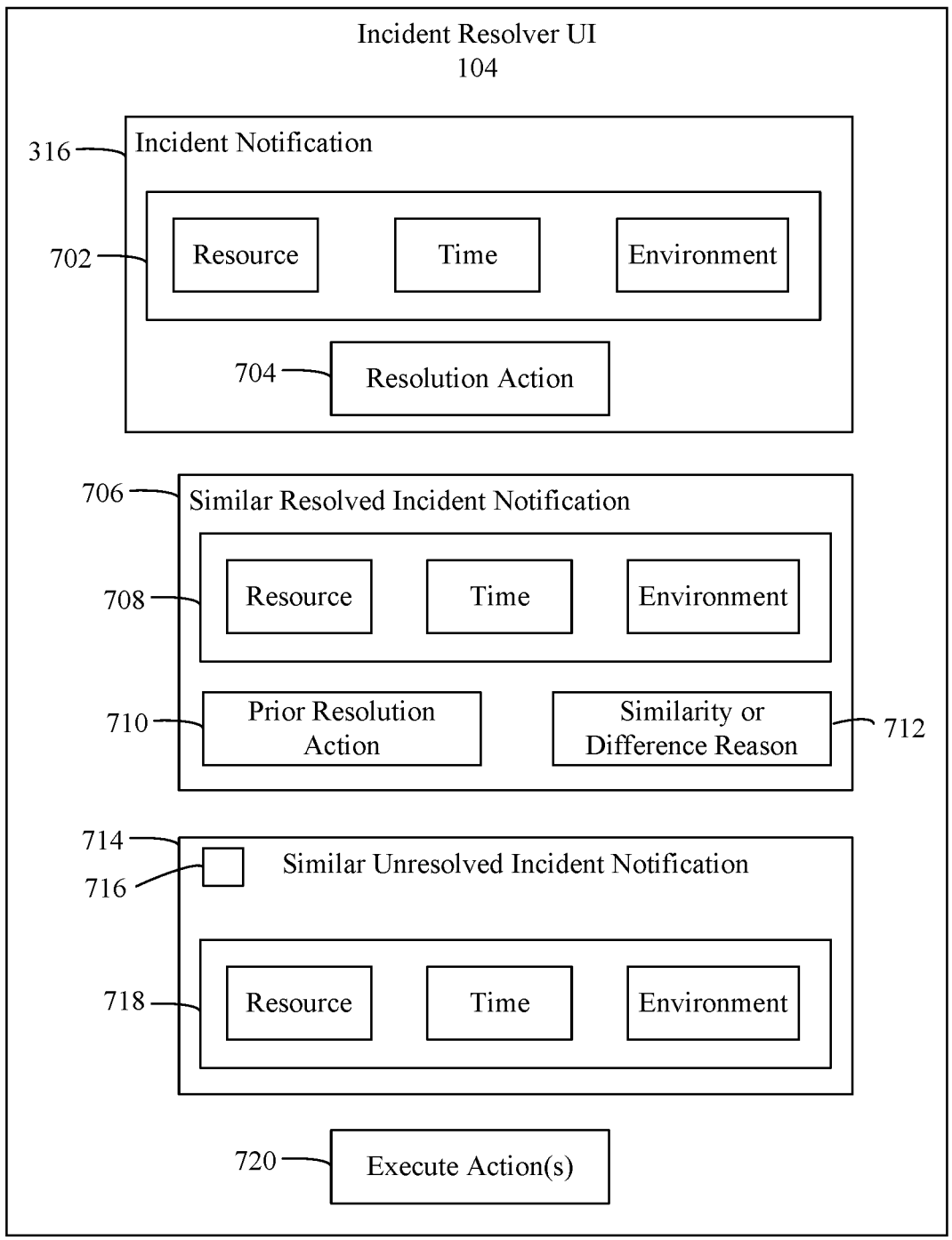
FIG. 7 shows an illustrative incident resolver graphical user interface, according to an example embodiment.

As described, incident resolver UI 104 may present information associated with incident notification 316 and one or more similar incident notifications in a suitable interface of computing device 102. For instance, FIG. 7 depicts an illustrative and non-limiting user interface of computing device 102 comprising incident resolver UI 104. In implementations, incident resolver UI 104 may present information and/or interactive user interface elements associated with incident notification 316, a similar resolved incident notification 706, and/or a similar unresolved incident notification 714.

For instance, incident notification 316 may comprise associated information 702 and an interactive control 704 to identify an action to resolve incident notification 316. Associated information 702 may comprise any information related to incident notification 316 described herein, including but not limited to information extracted from the incident notification and/or environmental data 318 associated with the incident notification.

Similar resolved incident notification 706 may comprise a similar incident notification identified by machine learning engine 308 as described above. In implementations, similar resolved incident notification 706 may comprise associated information 708 similar to associated information 702. Similar resolved incident notification 706 may also indicate a prior resolution action 710 that was previously executed to resolve the notification. In examples, the prior resolution action may comprise one or more actions to as described above, e.g., to identifying the notification as a true threat or a false positive, identifying a severity level, and/or executing a corrective action to remediate the notification. In some implementations, similar resolved incident notification 706 may optionally present a similarity or a difference reason 712 identifying a similarity or a difference between incident notification 316 and similar resolved incident notification 706, as described above. For instance, one or more significant differences (e.g., different affected resources, different environmental attributes, etc.) may be identified in incident resolver UI 104.

Similar unresolved incident notification may comprise an incident notification pending resolution (e.g., in a queue among other unresolved notifications) that machine learning engine 308 has identified as similar to incident notification 316. In example embodiments, similar unresolved incident notification 714 may similarly present associated information 718 in incident resolver UI 104. As described above, an interactive control 716 may be provided in incident resolver UI 104 to select the similar unresolved incident notification for resolution along with incident notification 316. For instance, if user determines that incident notification 316 should be resolved by making the notification as a false positive, the user may determine, based on similar unresolved incident notification 714 and associated information 718, that the similar unresolved notification should also be marked as a false positive. In such an example, the user may interact with interactive control 716 to select similar unresolved notification 714 to be executed along with incident notification 316.

Incident resolver UI 104 may also provide an interactive control 720 to initiate execution of one or more actions to resolve incident notification 316 and/or one or more similar unresolved incident notifications based on a user selection. Upon interacting with interactive control 720, action resolver 314 may carry out execution of the identified actions for each incident notification, thereby enabling multiple notifications to be resolved in an efficient manner.

It is noted that the user interface depicted in FIG. 7 is illustrative only and implementations are not intended to be limited to the content and layout of FIG. 7. In accordance with implementations described herein, incident resolver UI 104 may comprise any combination of user controls for interacting with incident notification 316, similar resolved incident notification 706, and/or similar unresolved incident notification 714. For example, incident resolver UI 104 may be configured to display similar resolved incident notification 706 and/or similar unresolved incident notification 714 upon a user selection of incident notification 316. In some other examples, incident resolver UI 104 may present any number of similar resolved incident notifications and/or similar unresolved incident notifications (e.g., ranked based on a corresponding measure of similarity).

Furthermore, incident resolver UI 104 may be configured to present information and/or controls associated with incident notification 316, similar resolved incident notification 706, and/or similar unresolved incident notification 714 in any appropriate format and/or arrangement. Furthermore, incident resolver UI 104 may be configured to present other types of information associated with any of similar incident notifications, such as a measure of similarity between incident notification 316, similar resolved incident notification 706, and/or similar unresolved incident notification 714.

Accordingly, in example embodiments, incident resolver UI 104 may provide an interface enabling a user to readily identify other incident notifications similar to a selected incident notification. Based on the information identified in incident resolver UI 104, the user may select an appropriate action to resolve incident notification 316 and/or more similar unresolved incident notifications 714 without needing to separately open and/or analyze each individual notification. In addition, incident resolver UI 104 may comprise a passive interface in which the user may appropriately select each resolution action and/or incident notification to be resolved, thereby ensuring that the user maintains control over the manner in which incident notifications are resolved. As a result of implementing incident resolver UI 104 in a passive mode, the risk of unintended resolution actions for any given incident notification may be reduced.

III. Example Computer System Implementation

One or more of the components of computing device 102, server 106, computing devices 112A-112N, incident clustering system 108, and one or more steps of flowcharts 200, 400, 500, 600, and 700 may be implemented in hardware, or hardware combined with software and/or firmware. For example, one or more of the components of computing device 102, server 106, computing devices 112A-112N, incident clustering system 108, and one or more steps of flowcharts 200, 400, 500, 600, and 700 may be implemented as computer program code/instructions configured to be executed in one or more processors and stored in a computer readable storage medium.

In another implementation, one or more of the components of computing device 102, server 106, computing devices 112A-112N, incident clustering system 108, and one or more steps of flowcharts 200, 400, 500, 600, and 700 may also be implemented in hardware that operates software as a service (SaaS) or platform as a service (PaaS). Alternatively, one or more of the components of computing device 102, server 106, computing devices 112A-112N, incident clustering system 108, and one or more steps of flowcharts 200, 400, 500, 600, and 700 may be implemented as hardware logic/electrical circuitry.

For instance, in an implementation, one or more of the components of computing device 102, server 106, computing devices 112A-112N, incident clustering system 108, and one or more steps of flowcharts 200, 400, 500, 600, and 700 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
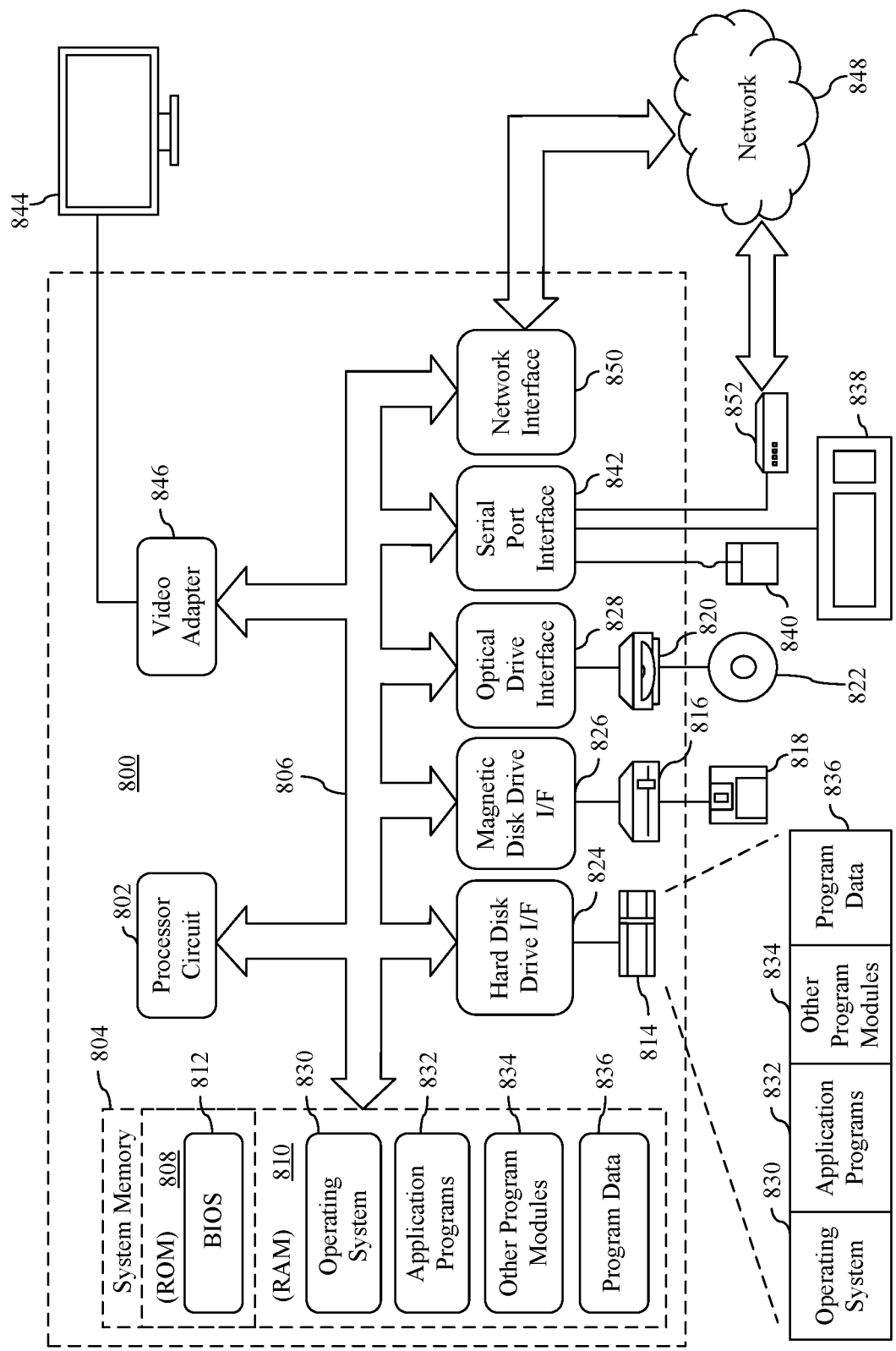
FIG. 8 is a block diagram of an example processor-based computer system that may be used to implement various example embodiments.

FIG. 8 depicts an implementation of a computing device 800 in which example embodiments may be implemented. For example, computing device 102, server 106, computing devices 112A-112N, and incident clustering system 108 may each be implemented in one or more computing devices similar to computing device 800 in stationary or mobile computer implementations, including one or more features of computing device 800 and/or alternative features. The description of computing device 800 provided herein is provided for purposes of illustration, and is not intended to be limiting. Example embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couple various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing one or more of the components of computing device 102, server 106, computing devices 112A-112N, incident clustering system 108, and one or more steps of flowcharts 200, 400, 500, 600, 700, and/or further implementations described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, stylus, pen, pointing device, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Implementations are also directed to such communication media that are separate and non-overlapping with implementations directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of example embodiments discussed herein. Accordingly, such computer programs represent controllers of the computing device 800.

Implementations are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A system for clustering incidents is described herein. The system includes at least one processor circuit; and a memory that stores program code configured to be executed by the at least one processor circuit, the program code comprising: a featurizer configured to receive an incident notification, the incident notification relating to an event occurring in a computing environment and generate a feature set based on the incident notification; a machine-learning engine configured to apply a machine-learning-based model to identify a similar incident notification in the computing environment based on the feature set; and an action resolver configured to: receive an action to resolve at least one of the incident notification and the similar incident notification and execute the action.

In one implementation of the foregoing system, the machine-learning-based model is configured to identify the similar incident notification based on a measure of similarity between the feature set of the incident notification and a feature set corresponding to the similar incident notification.

In another implementation of the foregoing system, the similar incident notification comprises a similar resolved incident notification.

In another implementation of the foregoing system, the machine-learning engine is configured to identify a corresponding action previously executed to resolve the similar resolved incident notification.

In another implementation of the foregoing system, the similar incident notification comprises a similar unresolved incident notification.

In another implementation of the foregoing system, the action resolver is configured to: receive an indication that the similar unresolved incident notification should be resolved along with the incident notification and execute the action to resolve the incident notification and similar unresolved incident notification.

In another implementation of the foregoing system, the feature set comprises a plurality of features, the plurality of features including: a feature extracted from the incident notification; and a feature extracted from a data feed separate from the incident notification and associated with at least one of a process creation, telemetry, or a network of the computing environment.

A method for resolving incidents is described herein. The method includes: receiving an incident notification, the incident notification relating to an event occurring in a computing environment; generating a feature set based on the incident notification; providing the feature set as input to a machine-learning-based model that outputs a similar unresolved incident notification in the computing environment; providing, for presentation in a user interface, information corresponding to the incident notification; receiving, from the user interface, an action selected by a user to resolve the incident notification; providing, for presentation in the user interface, an identification of the similar unresolved incident notification; receiving, from the user interface, a selection of the similar unresolved incident notification to be resolved along with the incident notification; and executing the action to resolve the incident notification and the similar unresolved incident notification.

In one implementation of the foregoing method, the machine-learning-based model is configured to output the similar unresolved incident notification based on a measure of similarity between the feature set of the incident notification and a feature set corresponding to the similar unresolved incident notification.

In another implementation of the foregoing method, the machine-learning-based model is further configured to output a similar resolved incident notification.

In another implementation of the foregoing method, the method further includes providing, for presentation in the user interface, a corresponding action executed to resolve the similar resolved incident notification.

In another implementation of the foregoing method, the method further includes providing, for presentation in the user interface, a reason indicating a similarity or a difference between the incident notification and the similar unresolved incident notification.

In another implementation of the foregoing method, the method further includes providing, for presentation in the user interface, a measure of similarity between the incident notification and the similar unresolved incident notification.

In another implementation of the foregoing method, the feature set comprises a plurality of features, the plurality of features including: a feature extracted from the incident notification and a feature extracted from a data feed separate from the incident notification and associated with at least one of a process creation, telemetry, or a network of the computing environment.

A method of resolving incidents is described herein. The method includes receiving an incident notification, the incident notification relating to an event occurring in a computing environment; generating a feature set based on the incident notification; providing the feature set as input to a machine-learning-based model that outputs a similar resolved incident notification in the computing environment; providing, for presentation in a user interface: information corresponding to the incident notification; an identification of the similar resolved incident notification; and a reason indicating a similarity or a difference between the incident notification and the similar resolved incident notification; and a corresponding action executed to resolve the similar resolved incident notification; receiving, from the user interface, an action selected by a user to resolve the incident notification; and executing the action to resolve the incident notification.

In one implementation of the foregoing method, the machine-learning-based model is configured to output the similar resolved incident notification based on a measure of similarity between the feature set of the incident notification and a feature set corresponding to the similar resolved incident notification.

In another implementation of the foregoing method, the machine-learning-based model is further configured to output a similar unresolved incident notification.

In another implementation of the foregoing method, the method further includes: receiving, from the user interface, an indication that the similar unresolved incident notification should be resolved along with the incident notification, and executing the action to resolve the incident notification and the similar unresolved incident notification.

In another implementation of the foregoing method, the method further includes: providing, for presentation in the user interface, a measure of similarity between the incident and the similar resolved incident notification.

In another implementation of the foregoing method, the feature set comprises a plurality of features, the plurality of features including: a feature extracted from the incident notification; and a feature extracted from a data feed separate from the incident notification and associated with at least one of a process creation, telemetry, or a network of the computing environment.

V. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the present invention should not be limited by any of the above-described example embodiments, but should be defined only in accordance with the following claims and their equivalents.

What is claimed is:

1. A system for clustering incidents, comprising:
at least one processor circuit; and
a memory that stores program code configured to be executed by the at least one processor circuit, the program code comprising:
  a featurizer configured to:
    receive an incident notification, the incident notification relating to an event occurring in a computing environment; and
    generate a feature set based on the incident notification, the feature set including an environmental feature extracted from a data feed separate from the incident notification and corresponding to the computing environment;
  a machine-learning engine configured to apply a machine-learning-based model to identify a similar incident notification in the computing environment based on the feature set; and
  an action resolver configured to:
    receive an action to resolve at least one of the incident notification and the similar incident notification; and
    execute the action.

2. The system of claim 1, wherein the machine-learning-based model is configured to identify the similar incident notification based on a measure of similarity between the feature set of the incident notification and a feature set corresponding to the similar incident notification.

3. The system of claim 1, wherein the similar incident notification comprises a similar resolved incident notification.

4. The system of claim 3, wherein the machine-learning engine is configured to identify a corresponding action previously executed to resolve the similar resolved incident notification.

5. The system of claim 1, wherein the similar incident notification comprises a similar unresolved incident notification.

6. The system of claim 5, wherein the action resolver is configured to:
receive an indication that the similar unresolved incident notification should be resolved along with the incident notification; and
execute the action to resolve the incident notification and similar unresolved incident notification.

7. The system of claim 1, wherein the feature set comprises a plurality of features, the plurality of features including a feature extracted from the incident notification; and
  wherein the environmental feature extracted from the data feed separate from the incident notification is associated with at least one of a process creation, telemetry, a network, a hardware configuration, or a geo-location of the computing environment.

8. A method for resolving incidents, the method comprising:
receiving an incident notification, the incident notification relating to an event occurring in a computing environment;
generating a feature set based on the incident notification, the feature set including an environmental feature extracted from a data feed separate from the incident notification and corresponding to the computing environment;
providing the feature set as input to a machine-learning-based model that outputs a similar unresolved incident notification in the computing environment;
providing, for presentation in a user interface, information corresponding to the incident notification;
receiving, from the user interface, an action selected by a user to resolve the incident notification;
providing, for presentation in the user interface, an identification of the similar unresolved incident notification;
receiving, from the user interface, a selection of the similar unresolved incident notification to be resolved along with the incident notification; and
executing the action to resolve the incident notification and the similar unresolved incident notification.

9. The method of claim 8, wherein the machine-learning-based model is configured to output the similar unresolved incident notification based on a measure of similarity between the feature set of the incident notification and a feature set corresponding to the similar unresolved incident notification.

10. The method of claim 8, wherein the machine-learning-based model is further configured to output a similar resolved incident notification.

11. The method of claim 10, further comprising:
providing, for presentation in the user interface, a corresponding action executed to resolve the similar resolved incident notification.

12. The method of claim 8, further comprising:
providing, for presentation in the user interface, a reason indicating a similarity or a difference between the incident notification and the similar unresolved incident notification.

13. The method of claim 8, further comprising:
providing, for presentation in the user interface, a measure of similarity between the incident notification and the similar unresolved incident notification.

14. The method of claim 8, wherein the feature set comprises a plurality of features, the plurality of features including a feature extracted from the incident notification; and
  wherein the environmental feature extracted from the data feed separate from the incident notification is associated with at least one of a process creation, telemetry, a network, a hardware configuration, or a geo-location of the computing environment.

15. A method for resolving incidents, the method comprising:
- receiving an incident notification, the incident notification relating to an event occurring in a computing environment;
- generating a feature set based on the incident notification, the feature set including an environmental feature extracted from a data feed separate from the incident notification and corresponding to the computing environment;
- providing the feature set as input to a machine-learning-based model that outputs a similar resolved incident notification in the computing environment;
- providing, for presentation in a user interface:
  - information corresponding to the incident notification;
  - an identification of the similar resolved incident notification; and
  - a reason indicating a similarity or a difference between the incident notification and the similar resolved incident notification; and
  - a corresponding action executed to resolve the similar resolved incident notification;
- receiving, from the user interface, an action selected by a user to resolve the incident notification; and
- executing the action to resolve the incident notification.

16. The method of claim 15, wherein the machine-learning-based model is configured to output the similar resolved incident notification based on a measure of similarity between the feature set of the incident notification and a feature set corresponding to the similar resolved incident notification.

17. The method of claim 15, wherein the machine-learning-based model is further configured to output a similar unresolved incident notification.

18. The method of claim 17, further comprising:
- receiving, from the user interface, an indication that the similar unresolved incident notification should be resolved along with the incident notification, and
- executing the action to resolve the incident notification and the similar unresolved incident notification.

19. The method of claim 15, further comprising:
- providing, for presentation in the user interface, a measure of similarity between the incident and the similar resolved incident notification.

20. The method of claim 15, wherein the feature set comprises a plurality of features, the plurality of features including a feature extracted from the incident notification; and
- wherein the environmental feature extracted from the data feed separate from the incident notification is associated with at least one of a process creation, telemetry, a network, a hardware configuration, or a geo-location of the computing environment.

* * * * *